(12) United States Patent
Koreis et al.

(10) Patent No.: US 8,733,628 B2
(45) Date of Patent: May 27, 2014

(54) ONBOARD DATA ARCHIVING SYSTEM AND METHOD

(75) Inventors: Rocke R. Koreis, Seattle, WA (US); William P. Coop, Buckley, WA (US); Rebecca Shore, Seattle, WA (US)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 12/946,262

(22) Filed: Nov. 15, 2010

(65) Prior Publication Data

US 2012/0118946 A1    May 17, 2012

(51) Int. Cl.
   *G06F 17/00*    (2006.01)
(52) U.S. Cl.
   USPC .......................................... 235/375; 235/381
(58) Field of Classification Search
   USPC .......... 235/375, 492, 486, 487, 382, 380, 381
   See application file for complete search history.

(56) References Cited

U.S. PATENT DOCUMENTS

| 5,304,786 A * | 4/1994 | Pavlidis et al. ........... 235/462.07 |
| 5,399,846 A * | 3/1995 | Pavlidis et al. ............. 235/462.1 |
| 5,504,322 A * | 4/1996 | Pavlidis et al. ................ 235/494 |
| 7,031,946 B1 | 4/2006 | Tamai et al. |
| 7,183,924 B1 | 2/2007 | Ku |
| 7,551,086 B2 | 6/2009 | Coop et al. |
| 2005/0061879 A1 * | 3/2005 | Honda ........................... 235/385 |
| 2005/0139664 A1 | 6/2005 | Yamagiwa |
| 2006/0140348 A1 * | 6/2006 | Wallace et al. ............ 379/29.01 |
| 2007/0075861 A1 | 4/2007 | Cook et al. |
| 2007/0171069 A1 * | 7/2007 | Allen ......................... 340/572.1 |
| 2007/0241908 A1 | 10/2007 | Coop |
| 2008/0030342 A1 * | 2/2008 | Elizondo et al. ........... 340/572.7 |
| 2008/0139083 A1 * | 6/2008 | Lampert et al. ................ 446/397 |
| 2008/0215375 A1 * | 9/2008 | Nakano et al. ..................... 705/4 |
| 2009/0261948 A1 * | 10/2009 | Ashizawa .................... 340/10.1 |
| 2010/0125468 A1 | 5/2010 | Avery et al. |
| 2012/0136765 A1 * | 5/2012 | Corn ............................... 705/34 |

FOREIGN PATENT DOCUMENTS

| EP | 1840755 A2 | 10/2007 |
| GB | 2328839 A | 3/1999 |

OTHER PUBLICATIONS

Ramohalli G Ed; Institute of Electrical and Electronics Engineers: "The Honeywell on-board diagnostic and maintenance system for the Boeing 777;" Proceedings of the Digital Avionics Systems Conference; Seattle, Oc. 5-8 1992.

PCT International Search Report and Written Opinion for PCT/US2011/055908, dated Dec. 7, 2011.

* cited by examiner

*Primary Examiner* — Thien M Le
(74) *Attorney, Agent, or Firm* — Parsons Behle & Latimer

(57) ABSTRACT

A data archiving system includes an archiving label including a label tag and a memory device carried by the label tag and a reading device adapted to retrieve repair information from the memory device.

20 Claims, 4 Drawing Sheets

ONBOARD DATA ARCHIVING SYSTEM AND METHOD

TECHNICAL FIELD

The disclosure generally relates to data archiving systems and methods. More particularly, the disclosure relates to an onboard data archiving system and method which are suitable for managing structural repair data onboard an aircraft.

BACKGROUND

In the repair of a structure such as an aircraft, paper and digital repair records may be required for repair authorization. However, archiving of repair records may be a manual and imprecise process. Significant time and effort may be expended to locate the repair records when they are needed. Repair records may be particularly important if a new repair which is physically close to or affected by an earlier repair is needed.

Current maintenance and repair methods may require a time-intensive process of cleaning and removing corrosion prior to performing non-destructive testing (NDT) to check for further need for repair. Under circumstances in which the part having the repair surface had previously reached the limit for material removal, the part may require complete replacement, rendering the cleaning and corrosion removing process unnecessary.

Therefore, an onboard data archiving system and method are needed in which repair records are stored on a repair surface adjacent to or near a repair area of a structure and are easily downloaded and transmitted to maintenance engineering personnel.

SUMMARY

The disclosure is generally directed to a data archiving system. An illustrative embodiment of the data archiving system includes an archiving label including a label tag and a memory device carried by the label tag and a reading device adapted to retrieve repair information from the memory device.

The disclosure is further generally directed to a data archiving method. An illustrative embodiment of the data archiving method includes affixing an archiving label having a label tag and a memory device carried by the label tag to a repair surface in vicinity of a first repair area; receiving archived repair information pertaining to the first repair area; and uploading the repair information to the memory device.

In some embodiments, the data archiving method may include affixing an archiving label having a label tag and a memory device carried by the label tag to a repair surface generally adjacent to a first repair area; receiving archived repair information pertaining to the first repair area; uploading the repair information to the memory device; retrieving the repair information from the memory device during subsequent repair in vicinity of the first repair area; and providing the repair information to a manufacturer for disposition of the subsequent repair.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description.

Figure 1:
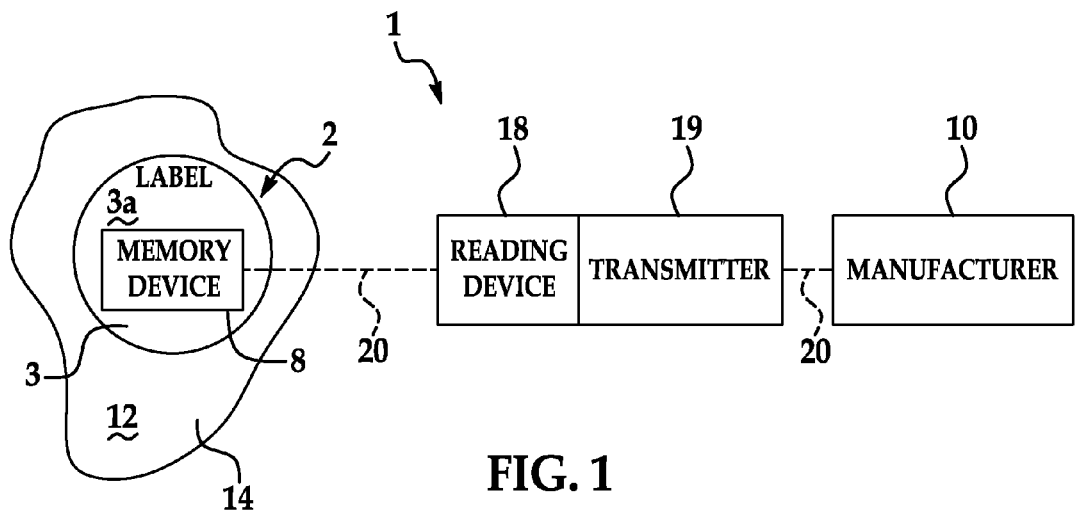
FIG. 1 is a schematic diagram illustrating exemplary application of an illustrative embodiment of the onboard data archiving system.
Figure 2:
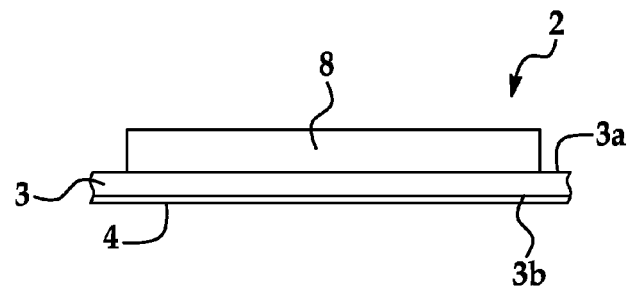
FIG. 2 is a side view, partially in section, of an archiving label of the onboard data archiving system.
Figure 3:
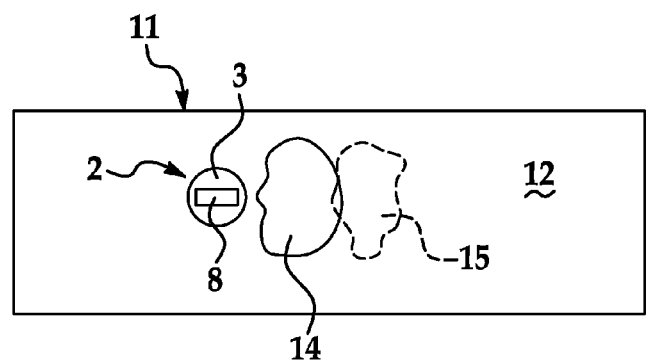
FIG. 3 is a top view with an archiving label of the onboard data archiving system affixed to a repair surface of a structure adjacent to a first repair area (solid lines) and a second repair area (in phantom) on the repair surface adjacent to the first repair area.

Referring initially to FIGS. 1-3, an illustrative embodiment of the onboard data archiving system, hereinafter system, is generally indicated by reference numeral 1. The system 1 may include an archiving label 2 which may include a label tag 3. The label tag 3 may be any desired size and shape and may be paper, plastic, composite and/or other material. The label tag 3 may have a visually distinguishable tag surface 3a and an adhesive surface 3b (FIG. 2). The visually distinguishable tag surface 3a may have an appearance which may be used to easily visually distinguish the label tag 3 from a surrounding repair surface 12 to which the archiving label 2 is applied, as will be hereinafter described. In some embodiments, the visually distinguishable tag surface 3a may have an appearance such as, for example and without limitation, a single color (such as orange) or a combination of colors; a pattern of lines or symbols; or any combination thereof. As shown in FIG. 2, an adhesive layer 4 may be provided on the adhesive surface 3b of the label tag 3 to facilitate attachment of the archiving label 2 to the repair surface 12 (FIG. 1).

A solid state memory device 8 may be provided on the visually distinguishable tag surface 3a of the label tag 3. The solid state memory device 8 may be any type of device which is capable of receiving, archiving and storing repair information 20 and facilitates selective retrieval of the repair information 20 such as by using a reading device 18 which is suitable for the purpose. The repair information 20 may include such information as the details of the repair procedure and the history of a repair, for example and without limitation. In some embodiments, the solid state memory device 8 may be a contact data button. In some embodiments, the solid state memory device 8 may be an RFID (Radio Frequency Identification) tag. In other embodiments, alternative solid state memory devices 8 which are known by those skilled in the art and are suitable for the purpose may be used. The reading device 18 may be capable of retrieving the archived repair information 20 from the solid state memory device 8 and displaying the retrieved repair information. A transmitter 19 may interface with the reading device 18 to transmit the repair information 20 from the reading device 18 to a manufacturer 10.

As shown in FIGS. 1 and 3, in exemplary application of the system 1, repair personnel (not shown) may initially transmit a repair request to a manufacturer 10 for repair of a structure 11 such as an aircraft, for example and without limitation. The manufacturer 10 may review the repair request and suggest a repair procedure for the structure 11. The repair personnel may accept the repair procedure and ask the manufacturer 10 for repair authorization. The manufacturer 10 may release a repair authorization and transmit repair information, which may include repair data, drawings, details of the repair procedure and history of the repair, for example and without limitation, to the repair personnel. The manufacturer 10 may additionally release authorization for programming of the memory device 8 of an archiving label 2.

After the repair personnel completes a first repair on a first repair area 14 (FIG. 3) on the repair surface 12, the repair personnel may program the repair information into the memory device 8 of the archiving label 2. The repair personnel may then affix the adhesive layer 4 on the label tag 3 to the repair surface 12 generally at or adjacent to the first repair area 14, as shown in FIG. 3.

At some point in time after completion of the first repair, the first repair area 14 may be opened for future repair or inspection. This analysis may necessitate that a second repair be carried out at a second repair area 15 which may overlap or be in close proximity to the first repair area 14. Accordingly, the repair information which was previously archived and stored on the memory device 8 of the archiving label 2 may be downloaded to the reading device 18. The repair information 20 may be de-encrypted and transmitted with a second repair request to the manufacturer 10. The manufacturer 10 may use the repair information 20 which pertains to the first repair area 14 to formulate a second repair procedure which is to be used to implement a second repair at a second repair area 16 which is coincident with or adjacent to the first repair area 14. The visually distinguishable tag surface 3a of the label tag 3 may enable repair personnel to readily locate the first repair area 14 on the repair surface 12 and to distinguish among multiple repair areas on the same repair surface 12. Therefore, repair information which relates to the first repair and is pertinent to a second repair to be carried out at the second repair area 15 may be properly analyzed to optimize repair of the second repair at the second repair area 15. The archiving label 2 may render historic and other data which relates to a previous repair easier to access in finding and considering previous repairs when performing maintenance on an airplane or other structure. Moreover, repair information which indicates previous removal of material from the repair surface 12 may limit rework, galley sub-floor repairs, scratch/dent management, one-off modifications (airframe, component, power plant, avionics and electrical) which may otherwise be difficult or impossible to identify.

It will be appreciated by those skilled in the art that the system 1 provides a visual cue for repair personnel which facilitates ease in locating a repair area on a repair surface and accessing information relating to a repair which was previously carried out at the repair area. The system 1 may facilitate instant recovery of detailed repair information which can be transmitted to a manufacturer or other entity for disposition and reduce unnecessary rework. In some applications, a data file may be provided for programming the memory device 8 upon completion of a repair. The memory device 8 may then be programmed by repair personnel and the archiving label 2 affixed to the repair surface 12 next to the first repair area 14 prior to closing out the first repair area 14. Data files stored on the memory device 8 may be encrypted for security, with un-encryption only possible by authorized personnel. Encryption of the data files may also be of a type which is readable by only the current owner of the airplane or other structure. This may ensure data security to the owner and allow the owner to control the release of sensitive data to future owners of the airplane or other structure.

Figure 4:
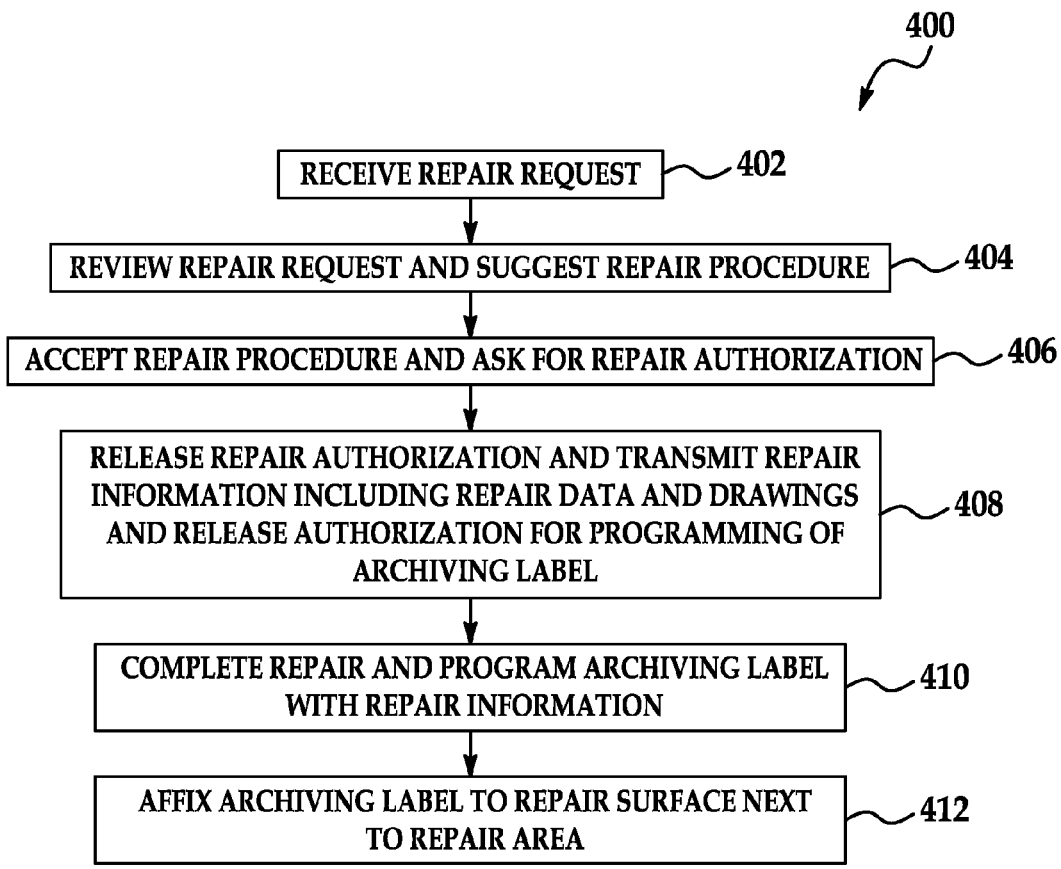
FIG. 4 is a flow diagram which illustrates an exemplary method of programming and installing an illustrative embodiment of the onboard data archiving system.

Referring next to FIG. 4, a flow diagram 400 which illustrates an exemplary method of programming and installing an illustrative embodiment of the onboard data archiving system is shown. In block 402, a repair request is received by a manufacturer of the structure which is being repaired. Repair personnel may transmit the repair request to the manufacturer. In block 404, the repair request is reviewed by the manufacturer and a repair procedure is suggested. In block 406, the repair procedure is accepted by the repair personnel and the repair personnel seeks repair authorization. In block 408, repair authorization is released by the manufacturer. Repair information, which may include repair data, drawings, repair procedure details and repair history, for example and without limitation, is transmitted from the manufacturer to the repair personnel. Authorization for programming of an archiving label with the repair information is released by the manufacturer. In block 410, the repair is completed and the archiving label is programmed with the repair information. In block 412, the archiving label is affixed to a repair surface in general proximity to a repair area in which the repair was made.

Figure 5:
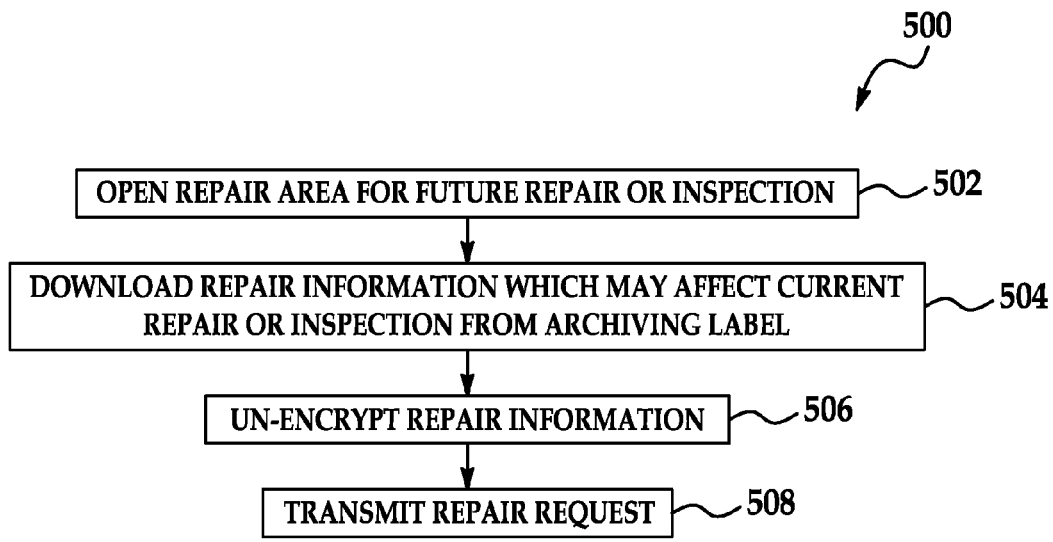
FIG. 5 is a flow diagram which illustrates an exemplary method of using an illustrative embodiment of the onboard data archiving system.

Referring next to FIG. 5, a flow diagram 500 which illustrates an exemplary method of using an illustrative embodiment of the onboard data archiving system is shown. In block 502, a repair area which may be in the vicinity of a first repair area is opened for future repair or inspection. In block 504, repair information which may affect the second or current repair or inspection is downloaded from the archiving label. In block 506, the repair information may be un-encrypted. In block 508, a repair request for the second repair, along with the repair information for the first repair, is transmitted from repair personnel to a manufacturer. Steps 402-412 which were set forth hereinabove with respect to FIG. 4 may follow block 508 in FIG. 5. The manufacturer may use the repair information which pertains to the first repair area to formulate a second repair procedure which is to be used to implement the second repair at the second repair area which is coincident with or adjacent to the first repair area.

Figure 6:
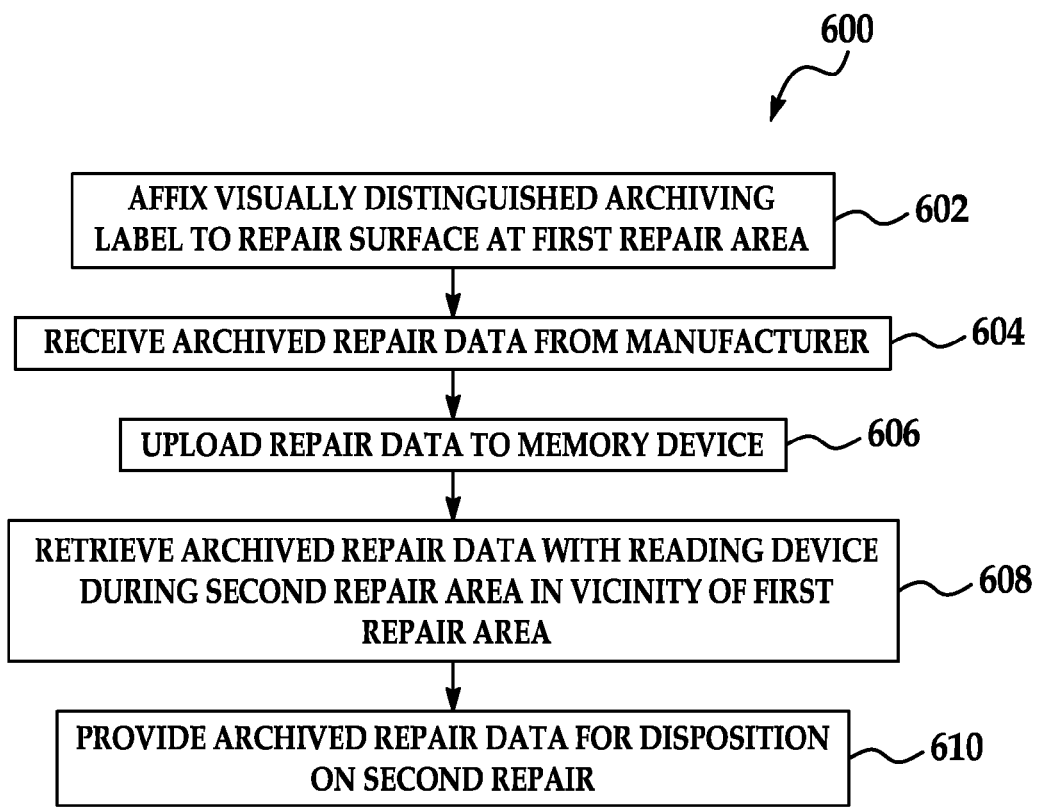
FIG. 6 is a flow diagram which summarizes an illustrative embodiment of an onboard data archiving method.

Referring next to FIG. 6, a flow diagram 600 which summarizes an illustrative embodiment of an onboard data archiving method is shown. In block 602, a visually distinguishable archiving label is affixed to a repair surface at a first repair area on a structure. In block 604, archived repair data from the archiving label is received from a manufacturer. In block 606, archived repair data is uploaded to a memory device of the archiving label. In block 608, the archived repair data is retrieved from the memory device of the archiving label using a reading device during a second repair carried out at a second repair area in the vicinity of the first repair area. In block 610, the archived repair data is provided for disposition on the second repair.

Figure 7:
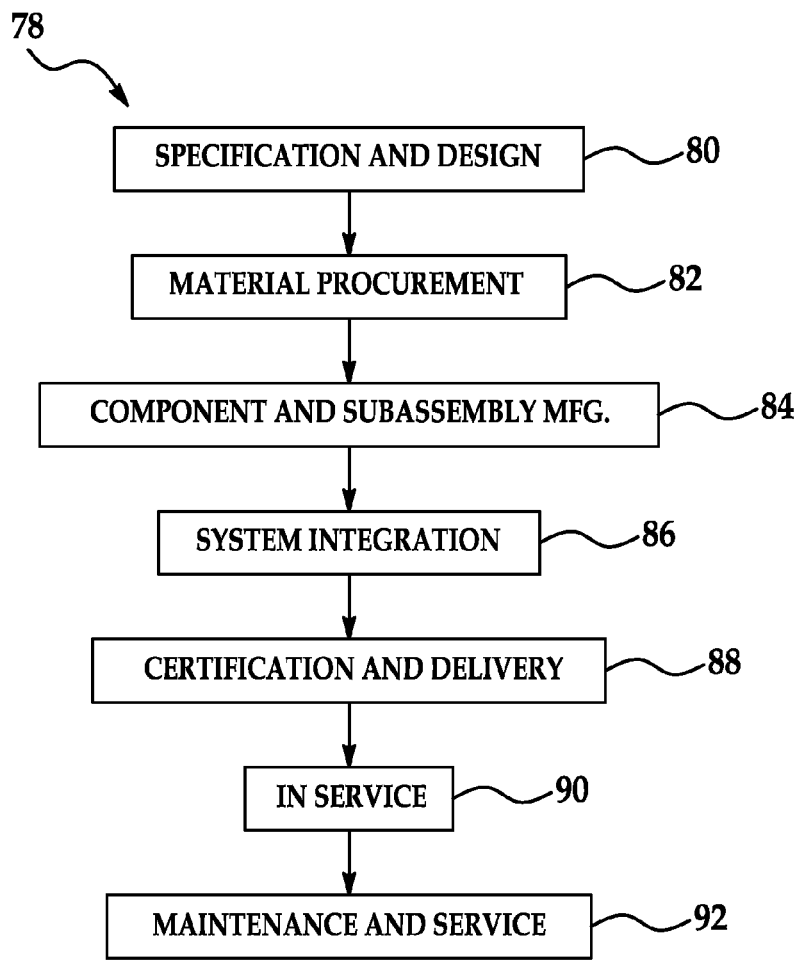
FIG. 7 is a flow diagram of an aircraft production and service methodology.
Figure 8:
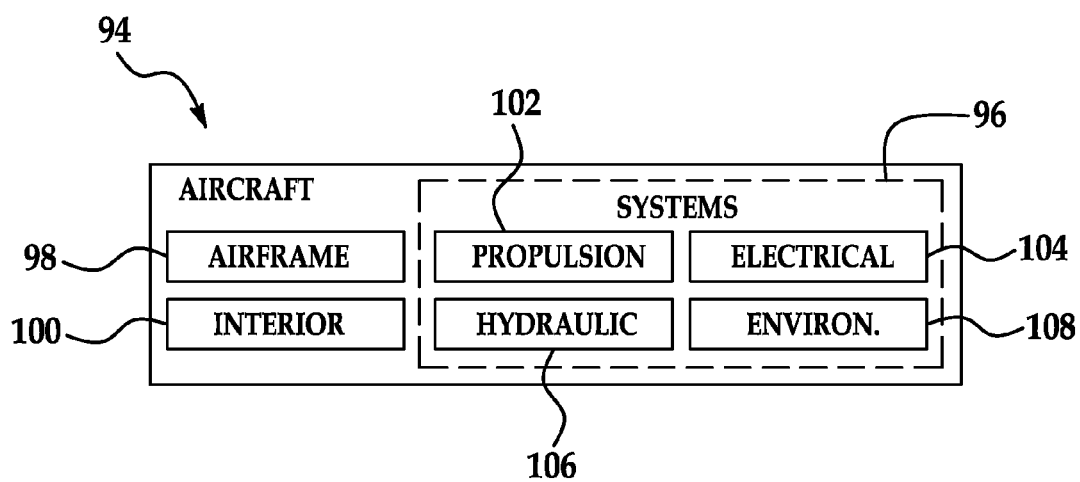
FIG. 8 is a block diagram of an aircraft.

Referring next to FIGS. 7 and 8, embodiments of the disclosure may be used in the context of an aircraft manufacturing and service method 78 as shown in FIG. 7 and an aircraft 94 as shown in FIG. 8. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A data archiving system, comprising:
    a structure having a repair surface with a first repair area at which a first repair procedure has been performed on the repair surface of the structure;
    an archiving label affixed to the repair surface of the structure at the location of the first repair area, the archiving label including a label tag and a memory device carried by said label tag, the memory device containing repair information regarding the first repair procedure performed at the first repair area on the repair surface of the structure; and
    a reading device adapted to retrieve the repair information from said memory device.

2. The data archiving system of claim 1 wherein said memory device comprises an RFID tag.

3. The data archiving system of claim 1 wherein said memory device comprises a contact data button.

4. The data archiving system of claim 1 wherein said label tag comprises a visually distinguishable tag surface.

5. The data archiving system of claim 4 wherein said visually distinguishable tag surface is a selected color.

6. The data archiving system of claim 1 further comprising a transmitter interfacing with said reading device and adapted to transmit said repair information.

7. The data archiving system of claim 1 wherein said repair information comprises at least one of a repair history and repair procedure detail.

8. The data archiving system of claim 1, further comprising:
    a second repair area at which a second repair procedure has been performed on the repair surface of the structure, the second repair area being located in close proximity to the first repair area;
    wherein the memory device contains repair information regarding the second repair procedure performed at the second repair area on the repair surface of the structure.

9. A data archiving method, comprising:
    performing a first repair procedure at a first repair area on a repair surface of a structure;
    affixing an archiving label having a label tag and a memory device carried by said label tag to the repair surface of the structure at the first repair area after completion of the first repair procedure; and
    programming repair information pertaining to said first repair procedure into said memory device.

10. The data archiving method of claim 9 wherein affixing an archiving label having a label tag and a memory device carried by said label tag to a repair surface comprises affixing an archiving label having a label tag and an RFID tag carried by said label tag to said repair surface.

11. The data archiving method of claim 9 wherein affixing an archiving label having a label tag and a memory device carried by said label tag to a repair surface comprises affixing an archiving label having a label tag and a contact data button carried by said label tag to said repair surface.

12. The data archiving method of claim 9 wherein affixing an archiving label having a label tag and a memory device carried by said label tag to a repair surface comprises affixing an archiving label having a label tag including a visually distinguishable tag surface and a memory device carried by said visually distinguishable tag surface to said repair surface.

13. The data archiving method of claim 12 wherein affixing an archiving label having a label tag including a visually distinguishable tag surface and a memory device carried by said visually distinguishable tag surface to said repair surface comprises affixing an archiving label having a label tag including a colored tag surface and a memory device carried by said colored tag surface to said repair surface.

14. The data archiving method of claim 9 wherein affixing an archiving label having a label tag and a memory device carried by said label tag to a repair surface comprises providing an adhesive layer on said label tag and affixing said adhesive layer to said repair surface.

15. A data archiving method, comprising:
    affixing an archiving label having a label tag and a memory device carried by said label tag to a repair surface of a structure generally adjacent to a first repair area of the structure after completion of a first repair procedure at the first repair area;
    storing repair information pertaining to said first repair area in said memory device;
    downloading said repair information from said memory device; and
    utilizing said repair information to formulate a second repair procedure to be performed at a second repair area that is located in close proximity to the first repair area.

16. The data archiving method of claim 15 wherein affixing an archiving label having a label tag and a memory device carried by said label tag to a repair surface comprises affixing an archiving label having a label tag and an RFID tag carried by said label tag to said repair surface.

17. The data archiving method of claim 15 wherein affixing an archiving label having a label tag and a memory device carried by said label tag to a repair surface comprises affixing an archiving label having a label tag and a contact data button carried by said label tag to said repair surface.

18. The data archiving method of claim 15 wherein affixing an archiving label having a label tag and a memory device carried by said label tag to a repair surface generally adjacent to a first repair area comprises affixing an archiving label having a label tag including a visually distinguishable tag surface and a memory device carried by said visually distinguishable tag surface to said repair surface.

19. The data archiving method of claim 18 wherein affixing an archiving label having a label tag including a visually distinguishable tag surface and a memory device carried by said visually distinguishable tag surface to said repair surface comprises affixing an archiving label having a label tag including a colored tag surface and a memory device carried by said colored tag surface to said repair surface.

20. The data archiving method of claim 15 wherein affixing an archiving label having a label tag and a memory device carried by said label tag to a repair surface comprises providing an adhesive layer on said label tag and affixing said adhesive layer to said repair surface.

\* \* \* \* \*